United States Patent
El-Khamy et al.

(10) Patent No.: US 11,055,866 B2
(45) Date of Patent: Jul. 6, 2021

(54) SYSTEM AND METHOD FOR DISPARITY ESTIMATION USING CAMERAS WITH DIFFERENT FIELDS OF VIEW

(71) Applicant: Samsung Electronics Co., Ltd., Gyeonggi-do (KR)

(72) Inventors: Mostafa El-Khamy, San Diego, CA (US); Xianzhi Du, San Jose, CA (US); Haoyu Ren, San Diego, CA (US); Jungwon Lee, San Diego, CA (US)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/365,167

(22) Filed: Mar. 26, 2019

(65) Prior Publication Data

US 2020/0134848 A1    Apr. 30, 2020

Related U.S. Application Data

(60) Provisional application No. 62/751,960, filed on Oct. 29, 2018.

(51) Int. Cl.
*G06T 7/593* (2017.01)
*H04N 13/239* (2018.01)
(Continued)

(52) U.S. Cl.
CPC ............ *G06T 7/593* (2017.01); *G06T 3/40* (2013.01); *H04N 13/133* (2018.05);
(Continued)

(58) Field of Classification Search
CPC . G06T 7/593; G06T 3/40; G06T 2207/20084; G06T 2207/10012;
(Continued)

(56) References Cited

U.S. PATENT DOCUMENTS 8,509,558 B2   8/2013   Ma et al.
8,619,082 B1 *  12/2013   Ciurea ................. H04N 13/232
                                                      345/427

(Continued)

FOREIGN PATENT DOCUMENTS

WO    WO 2016/167814    10/2016

OTHER PUBLICATIONS

"Multiresolution and Wide-Scope Depth Estimation Using a Dual-PTZ-Camera System", Wan et al., IEEE Transactions On Image Processing, vol. 18, No. 3, Mar. 2009 677.*

(Continued)

*Primary Examiner* — Mohammed S Rahaman
(74) *Attorney, Agent, or Firm* — The Farrell Law Firm, P.C.

(57) ABSTRACT

An electronic device and method are herein disclosed. The electronic device includes a first camera with a first field of view (FOV), a second camera with a second FOV that is narrower than the first FOV, and a processor configured to capture a first image with the first camera, the first image having a union FOV, capture a second image with the second camera, determine an overlapping FOV between the first image and the second image, generate a disparity estimate based on the overlapping FOV, generate a union FOV disparity estimate, and merge the union FOV disparity estimate with the overlapping FOV disparity estimate.

20 Claims, 15 Drawing Sheets

(51) Int. Cl.
*G06T 3/40* (2006.01)
*H04N 13/243* (2018.01)
*H04N 13/133* (2018.01)
*H04N 13/00* (2018.01)

(52) U.S. Cl.
CPC ......... *H04N 13/239* (2018.05); *H04N 13/243* (2018.05); *G06T 2207/10012* (2013.01); *G06T 2207/10024* (2013.01); *G06T 2207/10028* (2013.01); *G06T 2207/20084* (2013.01); *H04N 2013/0081* (2013.01)

(58) Field of Classification Search
CPC ........... G06T 2207/10028; G06T 2207/10024; H04N 13/133; H04N 13/239; H04N 13/243; H04N 2013/0081
See application file for complete search history.

(56) References Cited

U.S. PATENT DOCUMENTS

| | | | |
|---|---|---|---|
| 9,117,277 B2 | 8/2015 | Morgan-Mar et al. | |
| 9,600,889 B2 | 3/2017 | Boisson et al. | |
| 9,712,807 B2 | 7/2017 | Wu et al. | |
| 9,800,856 B2 | 10/2017 | Venkataraman et al. | |
| 9,888,229 B2 | 2/2018 | Meng et al. | |
| 9,900,584 B2 | 2/2018 | Nisenzon | |
| 9,942,474 B2 | 4/2018 | Venkataraman et al. | |
| 10,074,158 B2 | 9/2018 | Siddiqui et al. | |
| 10,115,182 B2 | 10/2018 | Zhang et al. | |
| 10,119,808 B2 | 11/2018 | Venkataraman et al. | |
| 10,297,070 B1* | 5/2019 | Zhu | G06K 9/6268 |
| 2014/0043444 A1 | 2/2014 | Haraguchi et al. | |
| 2015/0146029 A1* | 5/2015 | Venkataraman | H04N 17/002 348/218.1 |
| 2015/0334309 A1* | 11/2015 | Peng | H04N 13/271 348/47 |
| 2016/0150219 A1 | 5/2016 | Gordon et al. | |
| 2016/0309134 A1 | 10/2016 | Venkataraman et al. | |
| 2016/0337635 A1 | 11/2016 | Nisenzon | |
| 2017/0124711 A1* | 5/2017 | Chandraker | G06K 9/00201 |
| 2018/0139431 A1* | 5/2018 | Simek | H04N 13/232 |
| 2018/0144447 A1* | 5/2018 | Tate | G06T 5/003 |
| 2018/0211373 A1* | 7/2018 | Stoppa | G06T 7/55 |
| 2018/0300891 A1 | 10/2018 | Wang et al. | |
| 2019/0004535 A1* | 1/2019 | Huang | G06T 7/521 |

OTHER PUBLICATIONS

"Predicting Depth, Surface Normals and Semantic Labels with a Common Multi-Scale Convolutional Architecture", Eigen et. al. 2015 IEEE International Conference on Computer Vision, Dec. 2015.*

"Pyramid Stereo Matching Network", Chang et al., 2018 IEEE/CVF Conference on Computer Vision and Pattern Recognition, Jun. 2018.*

"Unsupervised Monocular Depth Estimation with Left-Right Consistency", Godard et al. http://visual.cs.ucl.ac.uk/pubs/monoDepth/, Apr. 2017.*

Wan, Dingrui et al., Multiresolution and Wide-Scope Depth Estimation Using a Dual-PTZ-Camera System, IEEE Transactions on Image Processing, vol. 18, No. 3, Mar. 2009, Copyright 2009 IEEE, pp. 677-682.

Chang, Jia-Ren et al., Pyramid Stereo Matching Network, arXiv:1803.08669v1 [cs.CV], Mar. 23, 2018, pp. 9.

Laina, Iro et al., Deeper Depth Prediction with Fully Convolutional Residual Networks, 2016 Fourth International Conference on 3D Vision, Copyright 2016 IEEE, pp. 239-248.

Sing Bing Kang, et al., An active multibaseline stereo system with real-time image acquisition, Sep. 1994, Carnegie Mellon University School of Computer Science, pp. 29.

Min, Dongbo et al., Fast Global Image Smoothing Based on Weighted Least Squares, IEEE Transactions on Image Processing, vol. 23, No. 12, Dec. 2014, Copyright 2014 IEEE, pp. 5638-5653.

Godard, Clement et al., Unsupervised Monocular Depth Estimation with Left-Right Consistence, 2017 IEEE Conference on Computer Vision and Pattern Recognition, Copyright 2017 IEEE, pp. 6602-6611.

* cited by examiner

SYSTEM AND METHOD FOR DISPARITY ESTIMATION USING CAMERAS WITH DIFFERENT FIELDS OF VIEW

PRIORITY

This application is based on and claims priority under 35 U.S.C. § 119(e) to a U.S. Provisional Patent Application filed on Oct. 29, 2018 in the United States Patent and Trademark Office and assigned Ser. No. 62/751,960, the entire contents of which are incorporated herein by reference.

FIELD

The present disclosure relates generally to an image processing system. In particular, the present disclosure relates to a method and system for disparity estimation using cameras with different fields of view.

BACKGROUND

There is recent interest in the estimation of the real world depth of elements in a captured scene. Depth estimation has many applications, such as the capability of separating the foreground (close) objects from the background (far) objects. Accurate depth estimation allows separation of the foreground objects of interest from the background in a scene. Accurate foreground-background separation allows processing of the captured images to emulate effects such as the Bokeh effect. Bokeh is the soft out-of-focus blur of the background which is typically mastered by using the right settings in expensive cameras with fast lenses and wide apertures, as well as making the cameras closer to the subject and the subject further away from the background to emulate the shallow depth-of-field.

Accurate depth estimation allows processing of images from non-professional photographers or cameras with smaller lenses (such as mobile phone cameras) to obtain more aesthetically pleasant images with the Bokeh effect which focuses on the subject. Other applications of accurate depth estimation include 3D object reconstruction and virtual reality (VR) applications (in VR applications, it is desired to change the background or the subject and render them according the desired VR). Other applications of accurate depth estimation from the captured scene include car automation, surveillance cameras, self-driving applications, and enhanced safety by improving the object detection accuracy and estimation of distance from the camera using the camera only, or from camera input as well as depth estimation from multiple sensors.

SUMMARY

According to one embodiment, an electronic device is provided. The electronic device includes a first camera with a first field of view (FOV), a second camera with a second FOV that is narrower than the first FOV, and a processor configured to capture a first image with the first camera, the first image having a union FOV, capture a second image with the second camera, determine an overlapping FOV between the first image and the second image, generate a disparity estimate based on the overlapping FOV, generate a union FOV disparity estimate, and merge the union FOV disparity estimate with the overlapping FOV disparity estimate.

According to one embodiment, a method is provided. The method includes capturing a first image with a first camera having a first field of view (FOV), the first image having a union FOV, capturing a second image with a second camera having a second FOV that is narrower than the first FOV, determining an overlapping FOV between the first image and the second image, generating a disparity estimate based on the overlapping FOV, generating a union FOV disparity estimate, and merging the union FOV disparity estimate with the overlapping FOV disparity estimate.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
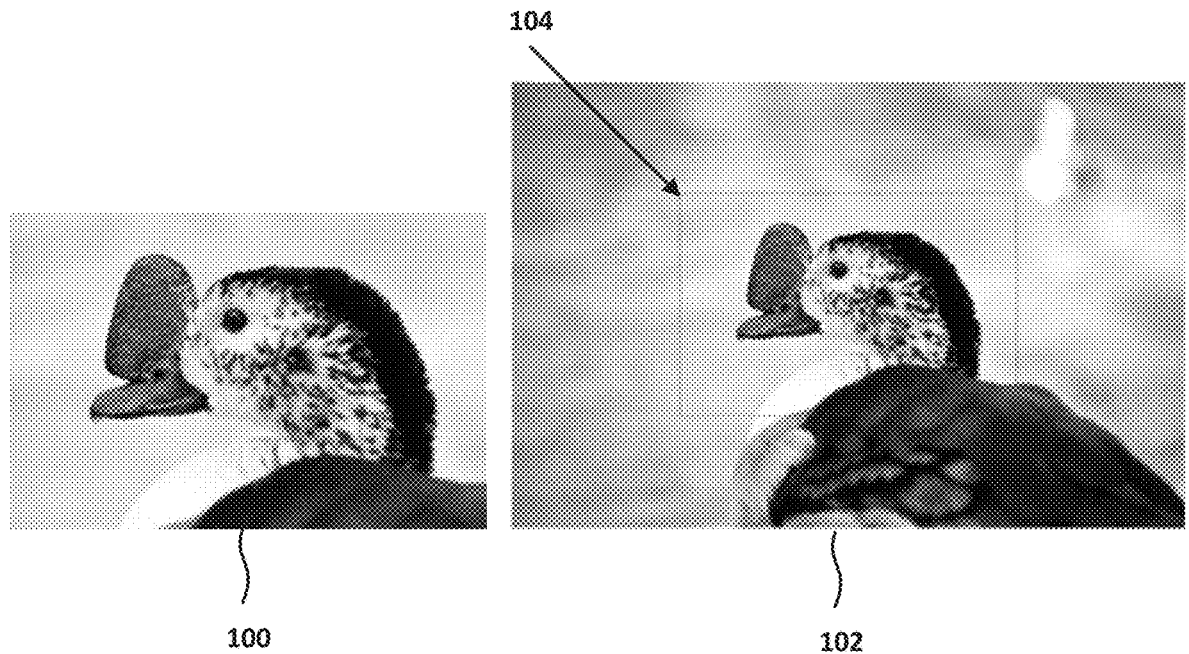
FIG. 1 is a diagram of a Bokeh effect, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1st," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

The present system and method provides estimation of the real world depth of elements in a scene captured by two cameras with different fields of view (FOVs). Accurate estimation of depth from two stereo rectified images can be obtained by calculating the disparity (e.g., the horizontal displacement) between pixels in both images.

The present system and method provides estimation of depth of all elements in the union of the FOVs of both images. Two cameras may be provided, one with a wide FOV, normally associated with low or no optical zoom, and the other with a narrower FOV, which is often associated with a larger optical zoom. Recent mobile devices are being equipped with two or more cameras. To take advantage of the extra cameras, their lenses are often chosen to have different optical zooms in order for the device to have good resolution at both near and far objects. Particularly, a zoom level of the lens may not be changed by the user due to physical constraints of the lens and the mobile device, or due to calibration and safety purposes such as self-driving applications.

The present system and method may be extended to multiple (e.g., more than two) cameras to determine the disparity from multiple stereo cameras.

For example, one lens in a device is set for 1× zoom (e.g., no magnification) and has wide-angle FOV (e.g., wide FOV), whereas the other lens in the device has 2× zoom (e.g., has a magnification of 2 times) has a narrower telephoto FOV (e.g., tele FOV). The union of these two FOVs is that of the wide FOV. As disclosed herein, estimation of the depth for the union of the FOVs, or in this case depth estimation for the whole wide FOV is performed, although correspondence pixels will only exist for the intersection of the FOVs, which is the tele FOV.

Examples of the present disclosure provide a unified architecture for a deep neural network that can perform depth estimation for the union of the FOVs from 2 or more cameras, rather than the overlapped intersection of FOVs only, a method for training the unified architecture on multiple tasks concurrently, and a method for fusion of results from single image depth estimation and stereo depth estimation algorithms/processes. Advantages include depth estimation for the entire FOV spanning all cameras rather than from the overlapped intersection of FOVs only, and generation of aesthetically better images which span the whole wide FOV by applying Bokeh on the entire wide FOV rather than on the intersection FOV, which is the narrower telephoto FOV, in case of dual cameras with fixed preset zoom, as wide 1× zoom, and tele photo 2× fixed zoom.

FIG. 1 is a diagram of a Bokeh effect, according to an embodiment. Bokeh is the process of blurring the background subjects in an image by making the far subjects out of focus, while making the closer subjects sharper or in focus. Image 100 depicts the Bokeh effect on the tele FOV, while Image 102 depicts the Bokeh effect on the wide FOV. An overlapping FOV 104 corresponds to the whole FOV of image 100. This effect can be obtained by the more expensive cameras with expensive lenses having a big aperture (low f-stop number) and long focal length to obtain a shallow depth of field. These lenses are hard to find in less expensive, small cameras or in cameras on mobile devices due to dimension and cost constraints of the image sensors and lens.

Figure 2:
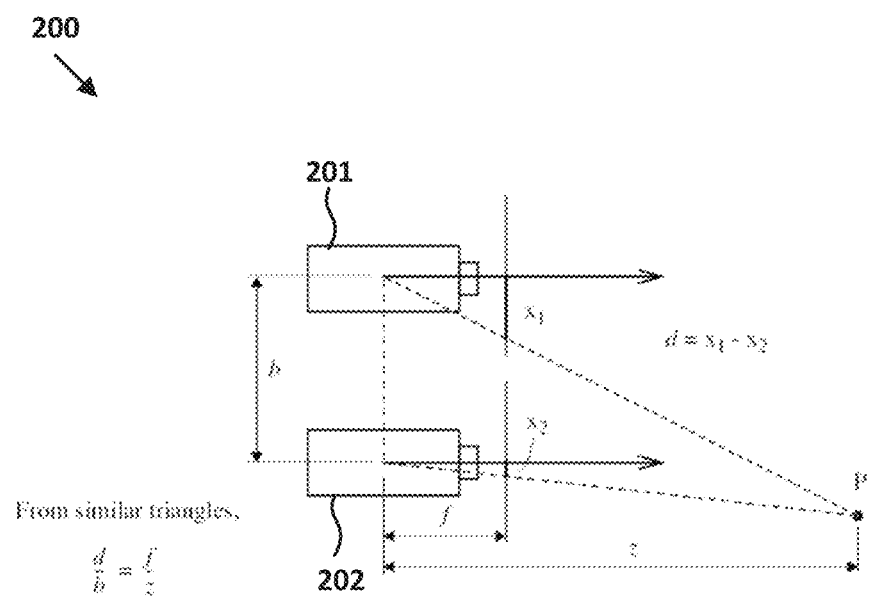
FIG. 2 is a diagram of a stereo matching system, according to an embodiment.

FIG. 2 is a diagram of a stereo matching system 200, according to an embodiment. Systems with no accurate depth estimation can rely on stereo matching between two rectified images captured from two cameras 201 and 202 with same FOV to determine the disparity d (horizontal shift as the difference between the horizontal distance x1 of point P with respect to camera 201 and the horizontal distance x2 of point P with respect to camera 202) between two corresponding pixels. For each pixel, the disparity can then be converted to a measure of the depth z of the subject P by knowledge of the camera baseline b and focal length/f.

Recent electronic devices are equipped with two or more cameras. The specifications of the two cameras may be (f/1.7, 26 mm, 1× optical zoom) and (f/2.4, 52 mm, 2× optical zoom), respectively. Whereas the first camera has a wider aperture, the second camera has a longer focal length and twice the optical zoom. However, the FOV of the second camera is just the center part of the image at 2× zoom (e.g., tele FOV). The FOV of the first camera is the whole wide FOV at 1× zoom. One reason for having cameras with different FOVs is for diversity where the larger aperture camera is used to obtain better images at low light settings and faster shutters, where the 2× zoom camera offers twice the optical zoom and a higher resolution image for the 2× FOV.

One application of stereo disparity matching is to produce a Bokeh effect in the image by blurring the background, while keeping the object of interest in focus. However, in this case, stereo matching can only be done for the center FOV which is overlapping between both cameras. Hence, if the user chooses to apply the Bokeh effect to the captured image, it can only be done for the center tele FOV, yielding image 100 of FIG. 1.

Figure 3:
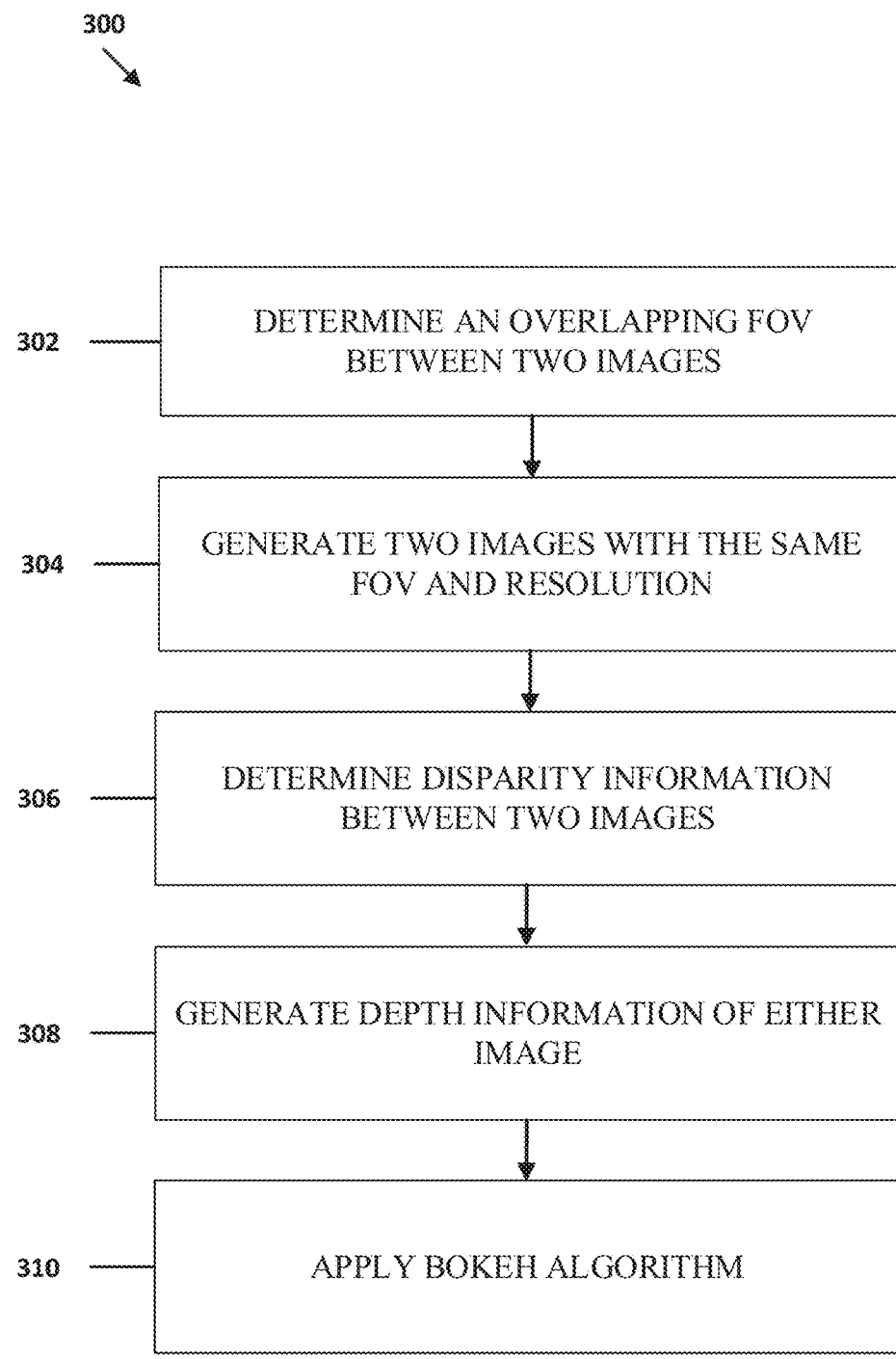
FIG. 3 is a flowchart for applying a Bokeh effect on an image using two images with similar FOV, according to an embodiment.

FIG. 3 is a flowchart 300 for applying a Bokeh effect on an image, according to an embodiment. At 302, an overlapping FOV between two images is determined. For example, referring to FIG. 1, the overlapping FOV 104 corresponds to the whole FOV of image 100.

At 304, two images with the same FOV and resolution are generated. The images may be generated by cropping the overlapping FOV 104 from the image 102 with the larger FOV, and down-scaling the overlapping FOV in the higher resolution image 100.

At 306, the disparity information between two images is determined. The disparity information may be determined by applying a stereo matching algorithm/process to the two images generated at 304. The disparity information may correspond to the horizontal shift between pixels between the image 100 and their corresponding pixels in the image 102 for the overlapping FOV 104.

At 308, depth information of either image is generated. The depth information may be generated by transforming the disparity information from 306 by appropriate inversion and scaling.

At 310, a Bokeh algorithm/process is applied. The Bokeh algorithm/process may blur far objects and focus on the near objects, yielding a result similar to the image 100, where the Bokeh effect can only be applied to the tele FOV of image 100.

As described herein, the overlapping FOV may refer to the FOV which exists in all cameras used, even if the FOV is at different scales. The union FOV may refer to the FOV resulting from augmenting the FOV of one reference camera with that of another camera after adjusting the scale to that of the reference image.

Figure 4:
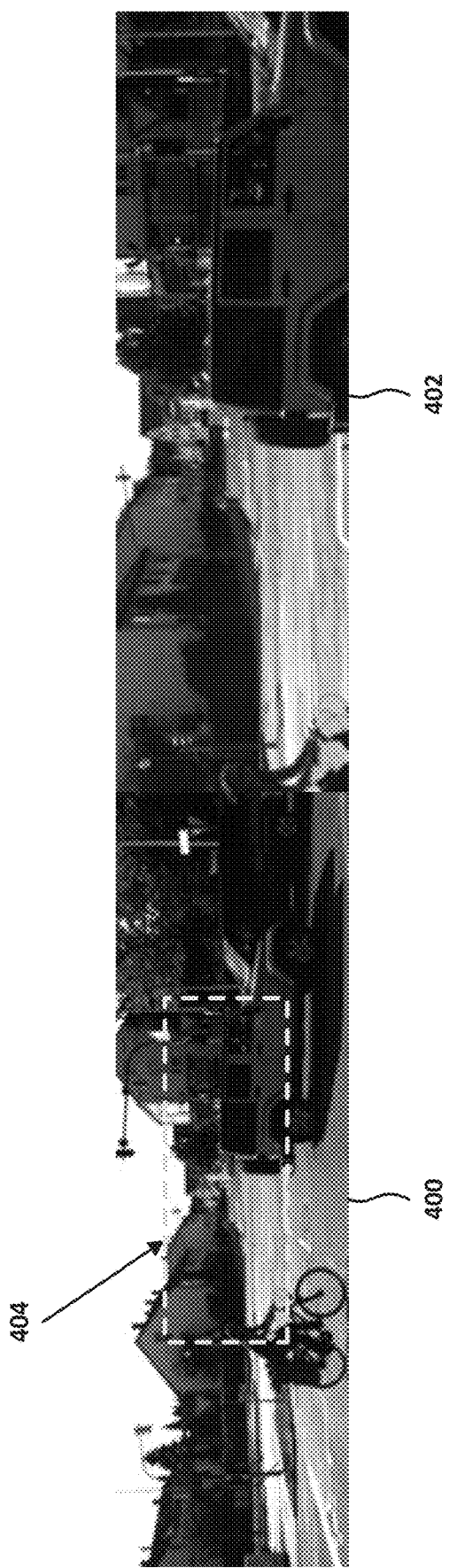
FIG. 4 is a diagram of images representing a union FOV and an overlapping FOV, according to an embodiment.

FIG. 4 is a diagram of images representing a union FOV and an overlapping FOV, according to an embodiment. Image 400 represents a union FOV, whereas image 402 represents an overlapping FOV. Image 400 includes an overlapping portion 404 with image 402. Image 402 is downsampled by a factor of 2 to match the resolution of image 400 at the overlapping FOV. The object of interest is often not centered in the tele FOV of image 402, and not totally captured by the tele FOV of image 402. Thus, as disclosed herein, a disparity estimate can be generated from the union FOV of image 400 using the overlapping FOV of image 402.

Figure 5:
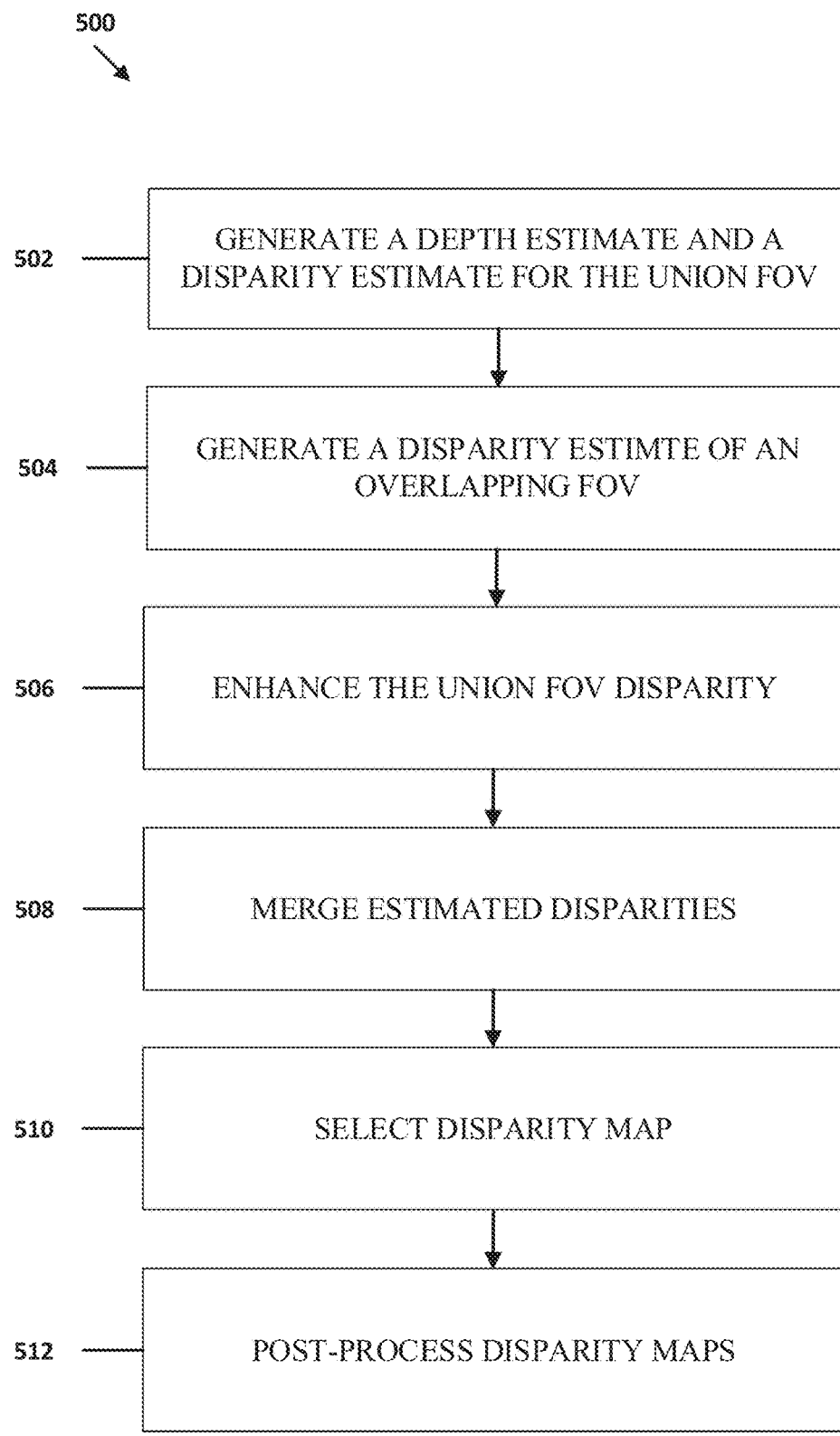
FIG. 5 is a flowchart for generating disparity of a union FOV, according to an embodiment.

FIG. 5 is a flowchart 500 for generating disparity of a union FOV, according to an embodiment. At 502, a depth estimate for the union FOV is generated and a disparity estimate of the union FOV is generated. The depth estimate may be generated by using scene understanding with single image depth estimation (SIDE).

Figure 6:
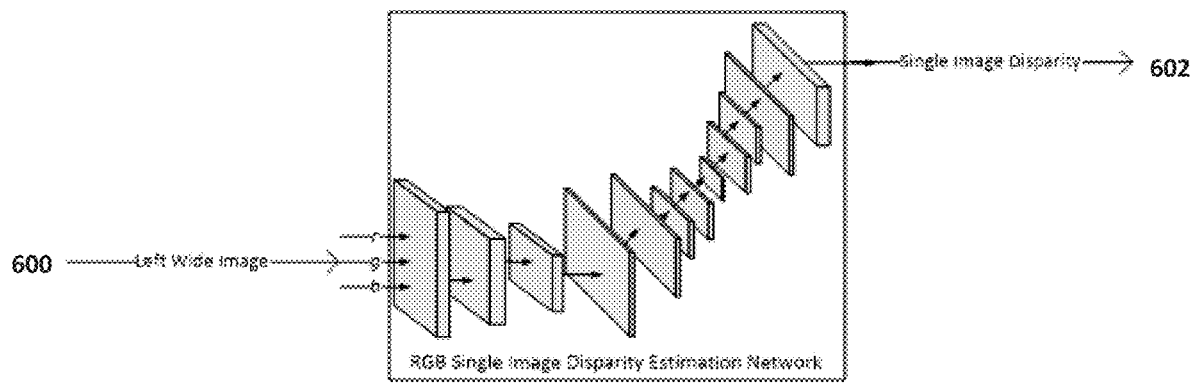
FIG. 6 is a diagram of a red-green-blue (RGB)-single image disparity estimation (SIDE) network, according to an embodiment.

FIG. 6 is a diagram of an RGB-SIDE network, according to an embodiment. The RGB-SIDE network is implemented with a fully convolutional neural network. Disparity estimation is performed for the full wide FOV (e.g., the union FOV 400), where information from only one camera is available in certain parts of the FOV. The union FOV image is input at 600 and the disparity estimation is output at 602. The RGB-SIDE network estimates inverse depth and the inverse depth is scaled to disparity implicitly within the network, by using the current camera settings (e.g., camera base line, camera focus length, etc.). In doing so, a regression based loss function can be used as a measure of disparity error, where for each pixel, the distance between the estimated disparity and the true disparity gives the error cost functions used for stochastic gradient descent optimization.

Since the RGB-SIDE network needs to understand the scene to learn the relative locations of the different objects with respect to the camera lens, the full wide image 400 is processed at once. The advantage of this solution is that the output provides an estimate of the disparity for the full wide FOV using only one image and one block. The disadvantage of this solution is the lack of accuracy, where the estimated disparity or depth is very coarse, has fuzzy edges, and is prone to large errors. The reason for this is the reliance on scene understanding and relative positions between objects as well as size of objects to estimate the depth of the objects in the FOV.

At 504, a disparity estimate of an overlapping FOV is generated. The disparity estimate may be generated between two images (such as two images generated at 304 of FIG. 3) by using stereo matching disparity estimation (SMDE). The SMDE network estimates the disparity from both input images. The SMDE network may estimate the disparity using neural networks. Multiple types of SMDE networks may be utilized, such as a tele-wide SMDE network (TW-SMNet), which can be applied for the overlapping FOV (TW-SMNet(T)) or the union FOV (TW-SMNet(W)), and a multi-task TW-SMNet (MT-TW-SMNet), which adds an additional SIDE network on a TW-SMNet(W).

Figure 7:
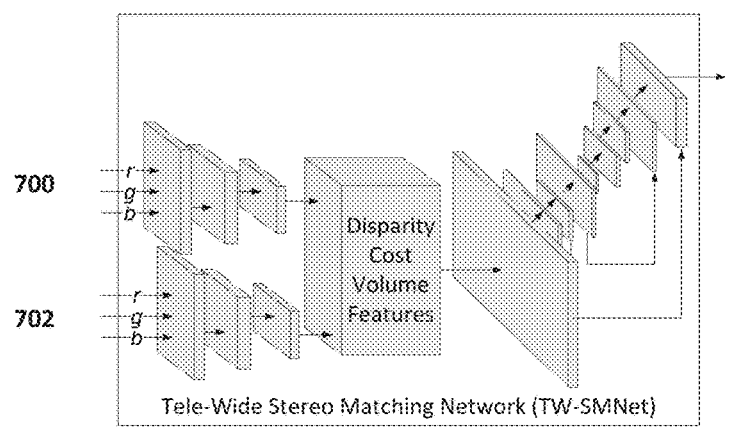
FIG. 7 is a diagram of a tele-wide stereo matching network, according to an embodiment.

FIG. 7 is a diagram of a TW-SMNet, according to an embodiment. In the network, both images 400 and 402 are input into the network at 700 and 702, respectively. The TW-SMNet estimates the disparity from both input images, using stereo matching. Stereo matching by classical techniques involving matching features in the rectified images along the same horizontal line. Deep neural networks can also perform stereo matching by generating shifted versions of the feature maps of images at different disparity shifts to construct a volume called the cost volume. The stereo matching deep neural networks rely on calculating a cost volume, such as the distance between the deep features, or correlation between the shifted deep features.

For the TW-SMNet(T), disparity estimation is only provided for the overlapped region using stereo matching. The overlapped portion 404 are the overlapping FOVs in images 400 and 402. This is done by considering the overlapped portion 404 only in the wide FOV image 400 and stereo matching it against the tele FOV image 402. An algorithm or neural network is designed to regress to the true disparity using only the overlapped regions. This scheme will give the best accuracy for the disparity estimates in the tele region.

For the TW-SMNet(W), the algorithm/process estimates the disparity for the union FOV, using the full wide FOV of the image 400. The image 402 is scaled to match the resolution of the overlapped portion 404 in the image 400. However, the missing regions, which in this case represent the surrounding region outside of the overlapped portion 404 are zero padded to reach the size of the full wide FOV. The output from this block is an estimate for the disparity map for the full wide FOV. This scheme will give decent accuracy for the disparity estimates in the tele region and fairly coarse estimates in the surrounding region.

Figure 8:
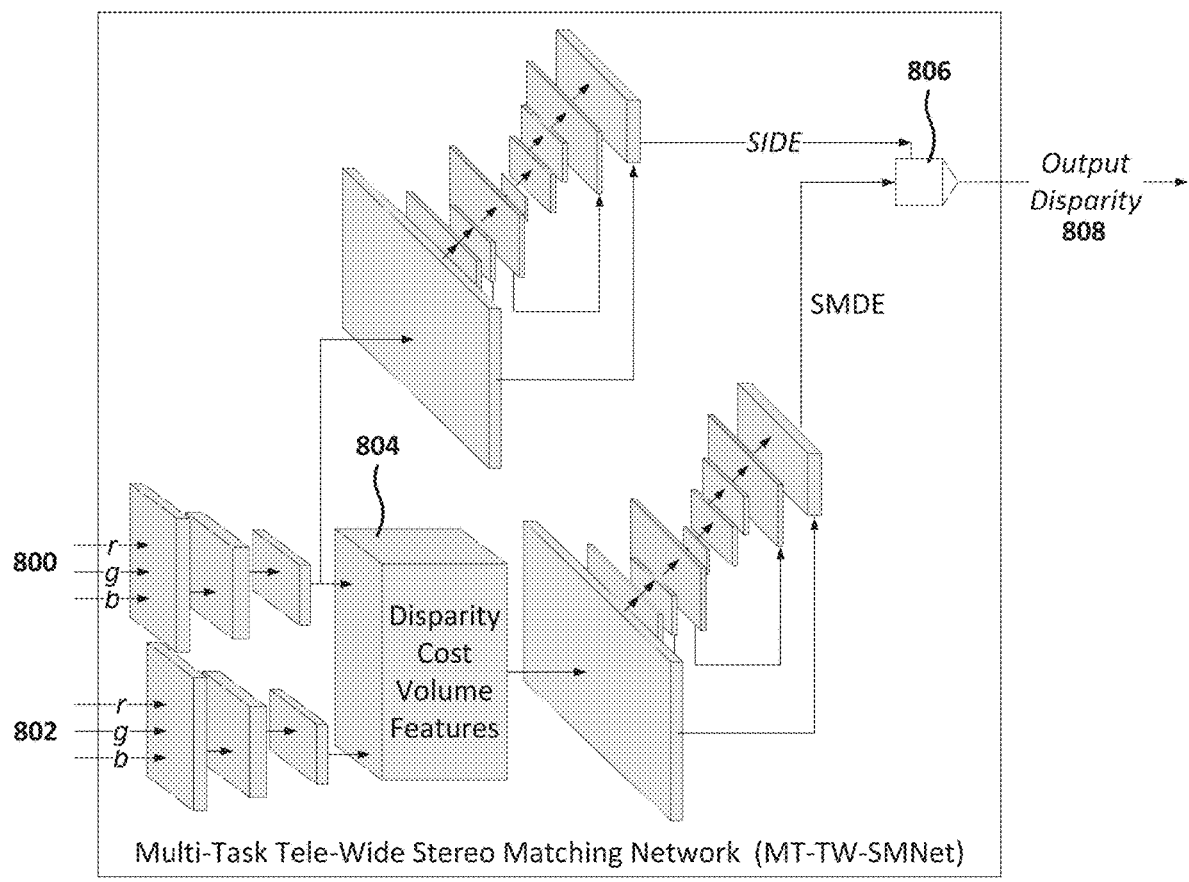
FIG. 8 is a diagram of a multi-task tele-wide stereo matching network, according to an embodiment.

FIG. 8 is a diagram of an MT-TW-SMNet, according to an embodiment. In FIG. 8, the wide FOV image 400 is input at 800, and the tele FOV image 402 is input at 800. An additional SIDE network is applied to the FOV image 400 input at 800.

This network is trained for disparity estimation by stereo matching. An additional head for SIDE based estimation on only the image 400 is added to the network before the cost volume 804. The two heads are trained together, so as the SIDE branch helps the shared layers have a better scene understanding capability. The network stereo matching loss is regularized against the SIDE loss. The loss function is thus a combined loss function 806 which takes into account the accuracy of the disparity estimate from the SIDE branch, as well as the accuracy of the disparity estimate from the SMDE branch, and the system outputs the disparity at 808. This improves the performance in the surrounding region (non-overlapped FOV) where no stereo matching can be done due to the lack of corresponding objects in the stereo images in this region. However, only one disparity map is output from this network, which is a function of both disparity maps from the SMDE and SIDE branches. This network may only select the stereo matching disparity maps as the final output as it often has a better accuracy.

Figure 9:
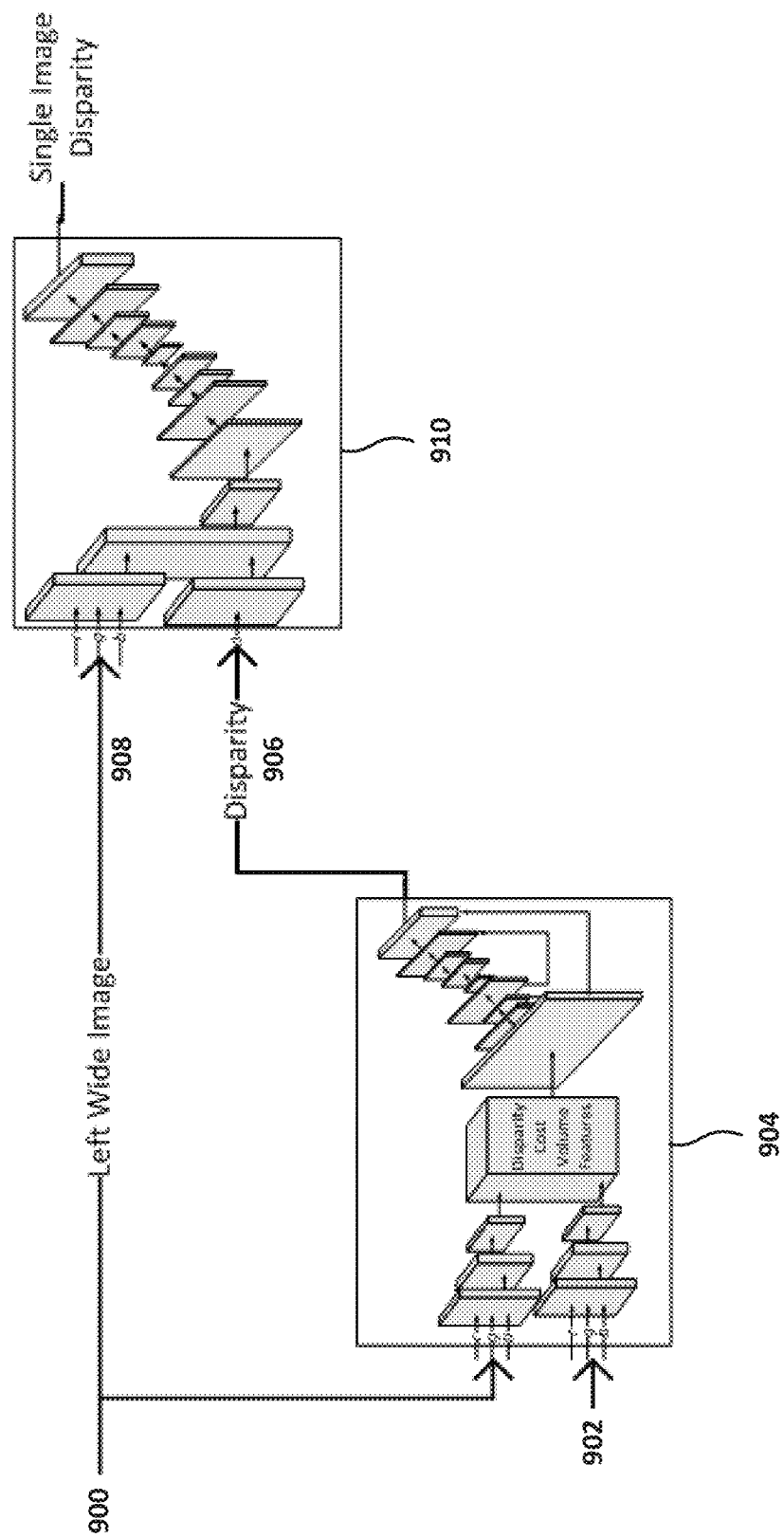
FIG. 9 is a diagram of a disparity enhancement system, according to an embodiment.

At 506, the union FOV disparity is enhanced. FIG. 9 is a diagram of a disparity enhancement system, according to an embodiment. In FIG. 9, the wide FOV image 400 is input at 900 of the TW-SMNet 904 and the tele FOV image 402 is input at 902 of the TW-SMNet, which generates and outputs the disparity. The wide FOV image 400 is also input into an SIDE RGB-Disparity (SIDE-RGBD) estimation network 910 at 908, and the disparity output by the TW-SMNet is input into 906 of the SIDE-RGBD network 910.

At 508, the estimated disparities are merged. FIGS. 10-13 are diagrams of systems for generating disparity estimates to be merged and post processed, according to an embodiment.

Figure 10:
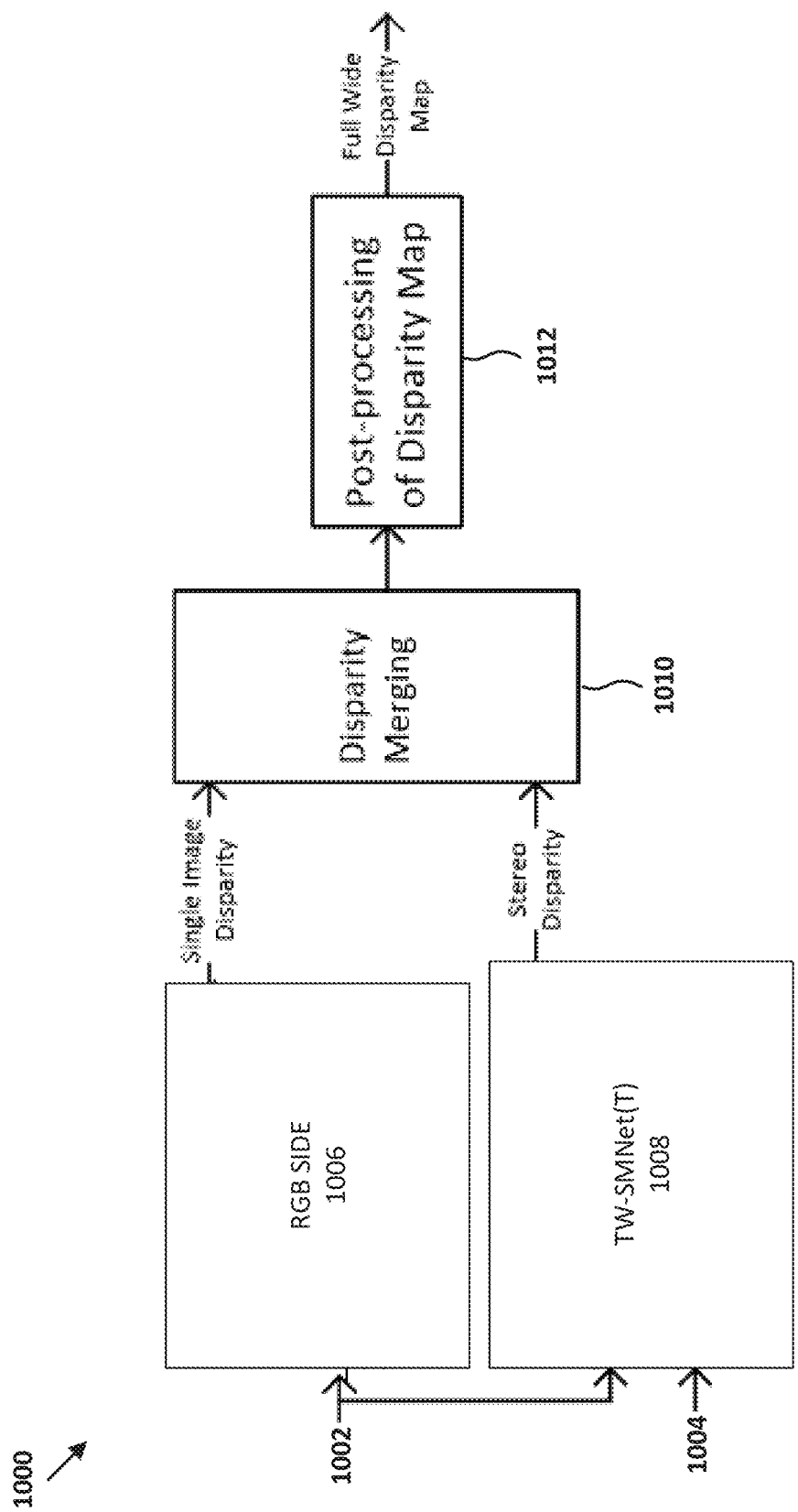
FIGS. 10, 11, 12 and 13 are diagrams of systems for generating disparity estimates to be merged and post processed, according to an embodiment.

FIG. 10 depicts an RGB SIDE +TW-SMNet(T) system 1000. A wide FOV image 1002 is input into an RGB SIDE network 1006 and a TW-SMNet(T) 1008, while a tele FOV image 1004 is input into the TW-SMNet(T) 1008. The resulting disparity estimates are merged at 1010 and a disparity map is processed at 1012.

Figure 11:
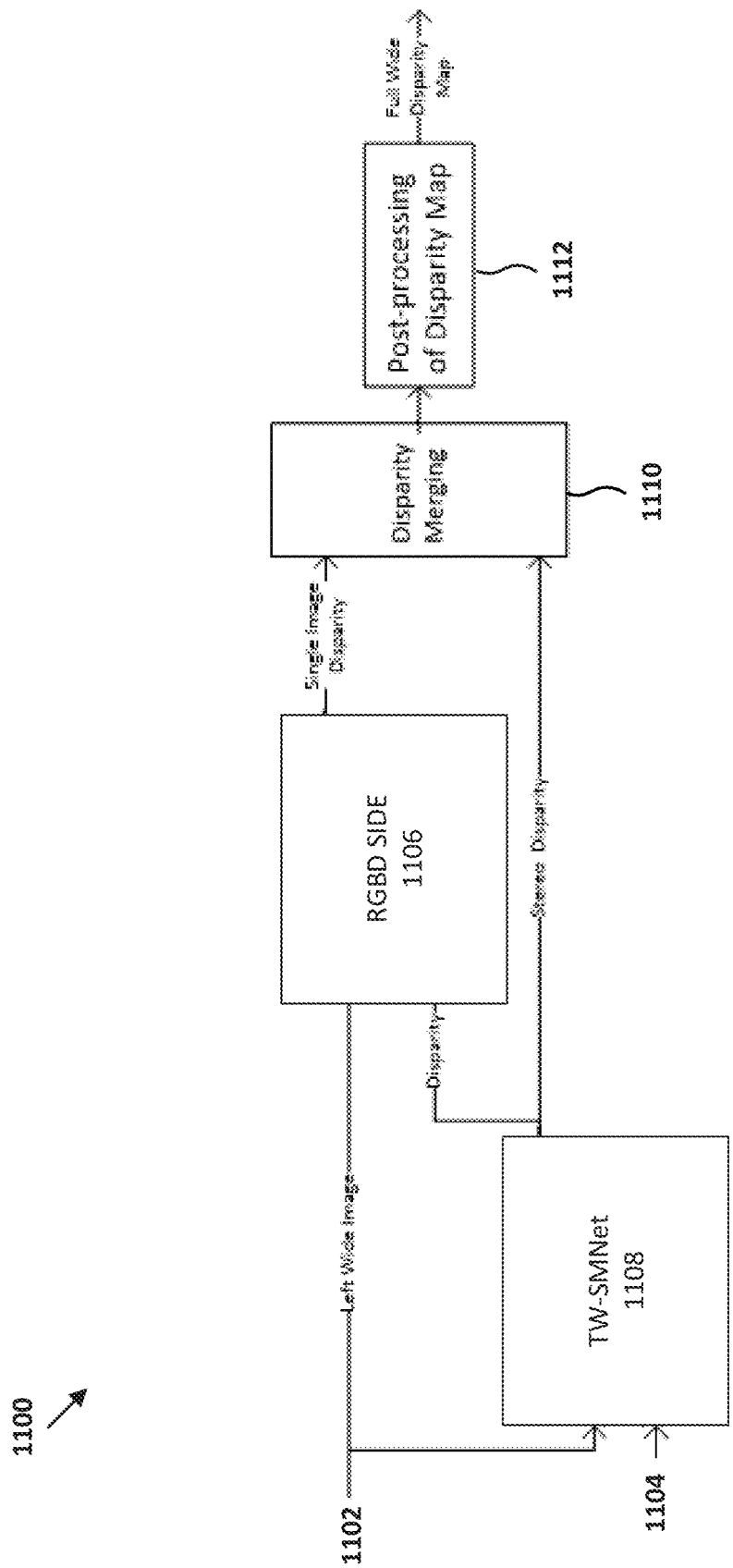

FIG. 11 depicts an RGBD SIDE +TW-SMNet system 1100. A wide FOV image 1102 is input into an RGBD SIDE network 1106 and a TW-SMNet 1108, while a tele FOV image 1104 is input into the TW-SMNet 1108. The resulting disparity estimates are merged at 1110 and a disparity map is processed at 1112.

Figure 12:
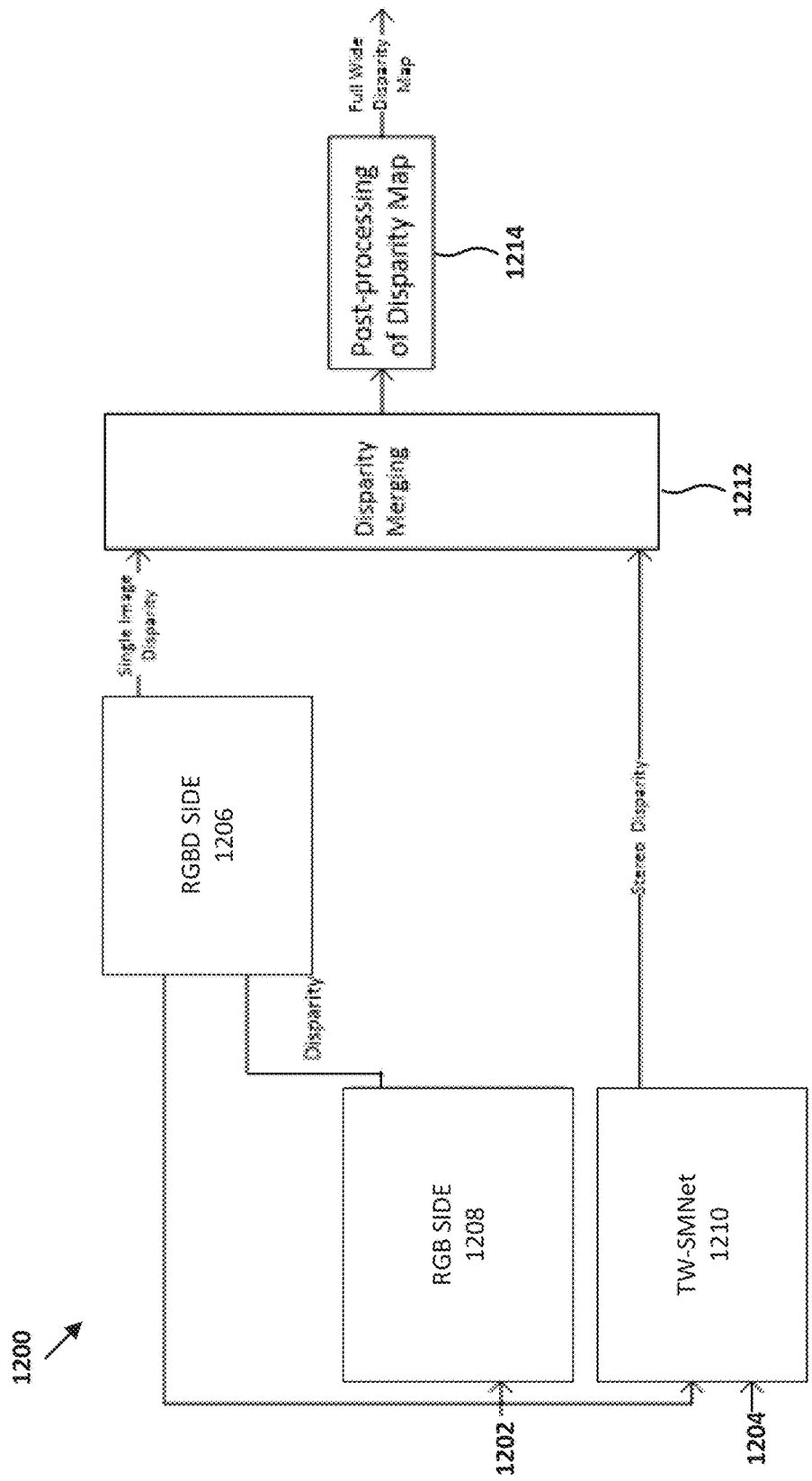

FIG. 12 depicts an RGB SIDE +RGBD SIDE +TW-SMNet system 1200. A wide FOV image 1202 is input into an RGBD SIDE network 1206, an RGB SIDE network 1208, and a TW-SMNet 1210, while a tele FOV image 1204 is input into the TW-SMNet 1210. The disparity estimate from the RGB SIDE network 1208 is input into the RGBD SIDE network 1206. The resulting disparity estimates from the RGBD SIDE network 1206 and the TW-SMNet 1210 are merged at 1212 and a disparity map is processed at 1214.

Figure 13:
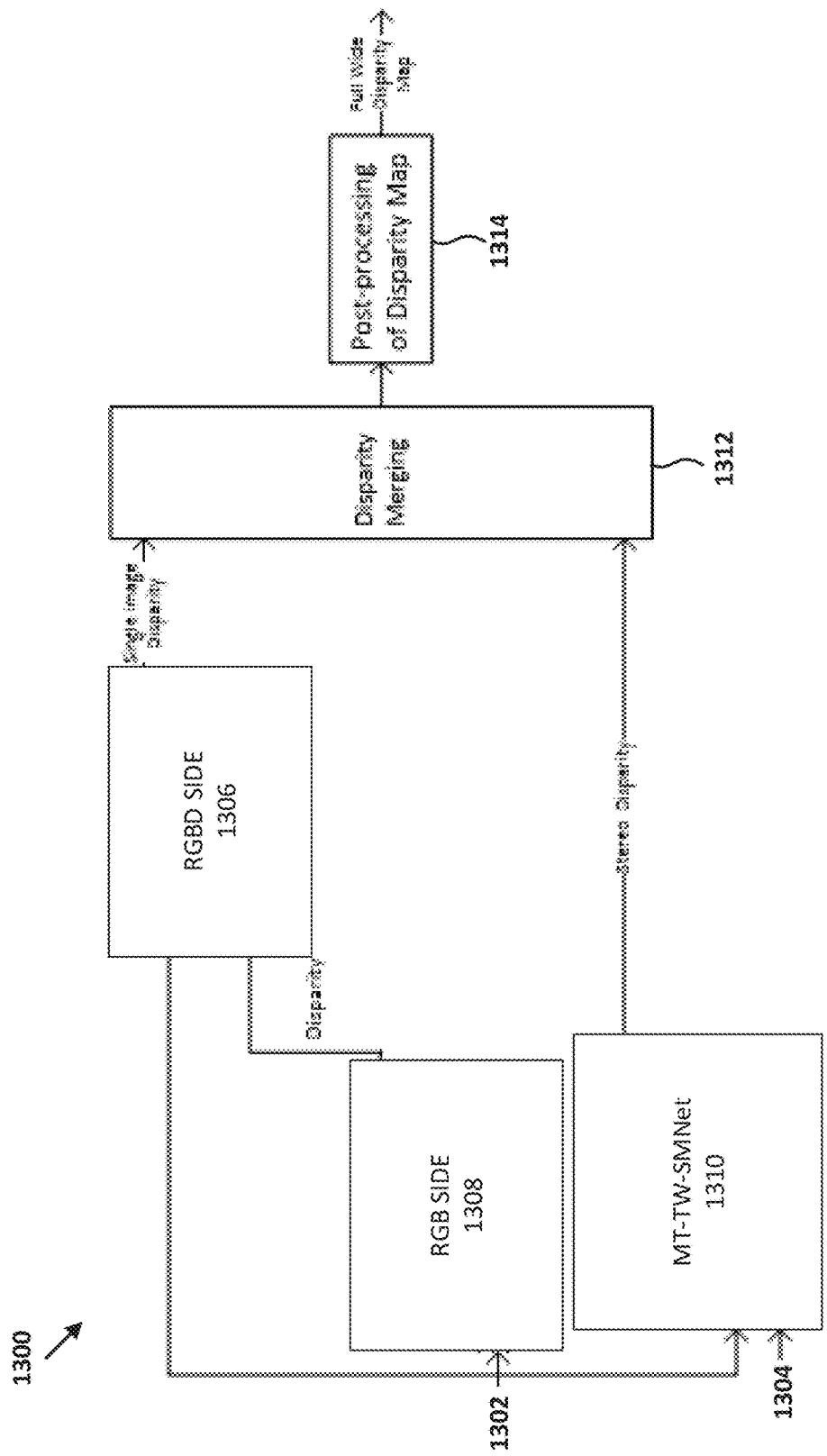

FIG. 13 depicts an RGB SIDE +RGBD SIDE +MT-TW-SMNet system 1300. A wide FOV image 1302 is input into an RGBD SIDE network 1306, an RGB SIDE network 1308, and an MT-TW-SMNet 1310, while a tele FOV image 1304 is input into the MT-TW-SMNet 1310. The disparity estimate from the RGB SIDE network 1308 is input into the RGBD SIDE network 1306. The resulting disparity estimates from the RGBD SIDE network 1306 and the TW-SMNet 1310 are merged at 1312 and a disparity map is processed at 1314.

Disparity merging may be performed based on a bias adjustment by estimating a bias b between the overlapping FOV of two disparity maps $d_1$, $d_2$, as in Equation (1):

$$b = \frac{1}{n} \sum_{(i,j) \in OL\_FOV} (d_1(i,j) - d_2(i,j)) \quad (1)$$

where n is the number of pixels in overlapping FOV. The surrounding disparity of $d_2$ may be adjusted based on b, and then a weighted sum or disparity selection with $d_1$ may be applied.

Disparity merging may be performed based on scale adjustment, where a scale difference s is estimated between the overlapping FOV of two disparity maps $d_1$, $d_2$, where n is the number of pixels in overlapping FOV as in Equation (2):

$$s = \frac{1}{n} \sum_{(i,j) \in OL\_FOV} (d_1(i,j) / d_2(i,j)) \quad (2)$$

The surrounding disparity of $d_2$ may be adjusted based on s, and then a weighted sum or disparity selection with $d_1$ may be applied.

Figure 14:
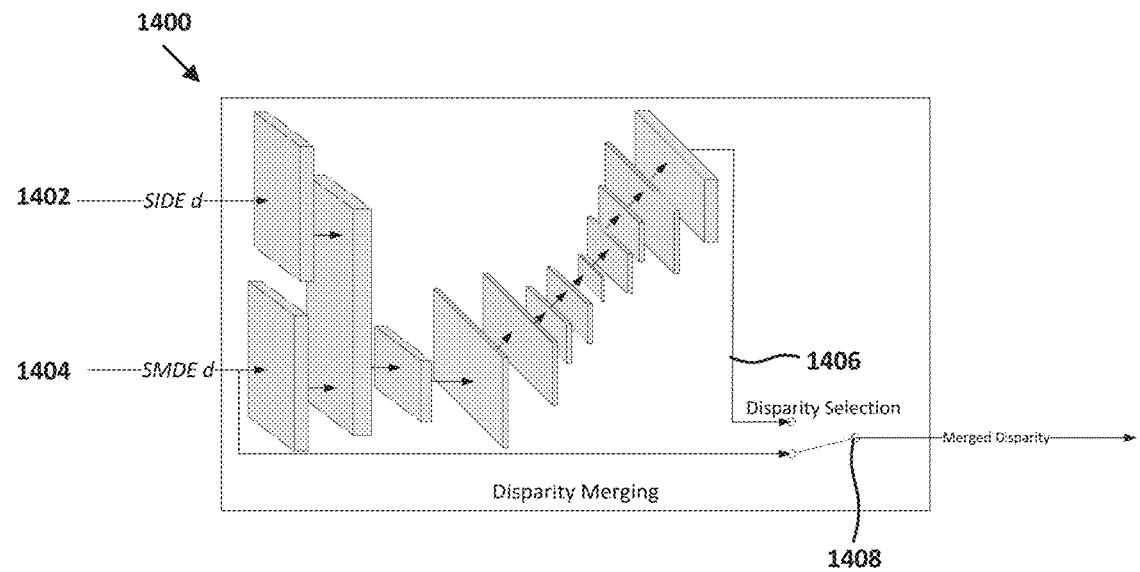
FIG. 14 is a diagram of disparity merging and selection, according to an embodiment.

At 510, a disparity map is selected. Disparity merging can also be achieved by a learned non-linear function from a neural network, which can be implemented by a stacked hourglass network. FIG. 14 is a diagram of disparity merging and selection, according to an embodiment. In FIG. 14, a SIDE disparity 1402 and an SMDE disparity 1404 are merged by the disparity merging network. The network is trained by regression to the ground truth disparity. One way to train the network is to quantize the disparity into levels and learn a classifier that output a soft probability for each level. The regressed output 1406 is the expected value of the disparity where the expectation is calculated with the estimated probability. Furthermore, the output merged disparity 1406 is a nonlinear function of the input disparities obtained by SIDE 1402 and SMDE 1404.

The disparity of the overlapping FOV may be the most accurate by using SMDE. Hence, the selector 1408 can choose to select the merged disparity 1406 for the surrounding regions, or the disparity from the SMDE 1404 for the overlapping tele FOV.

Figure 15:
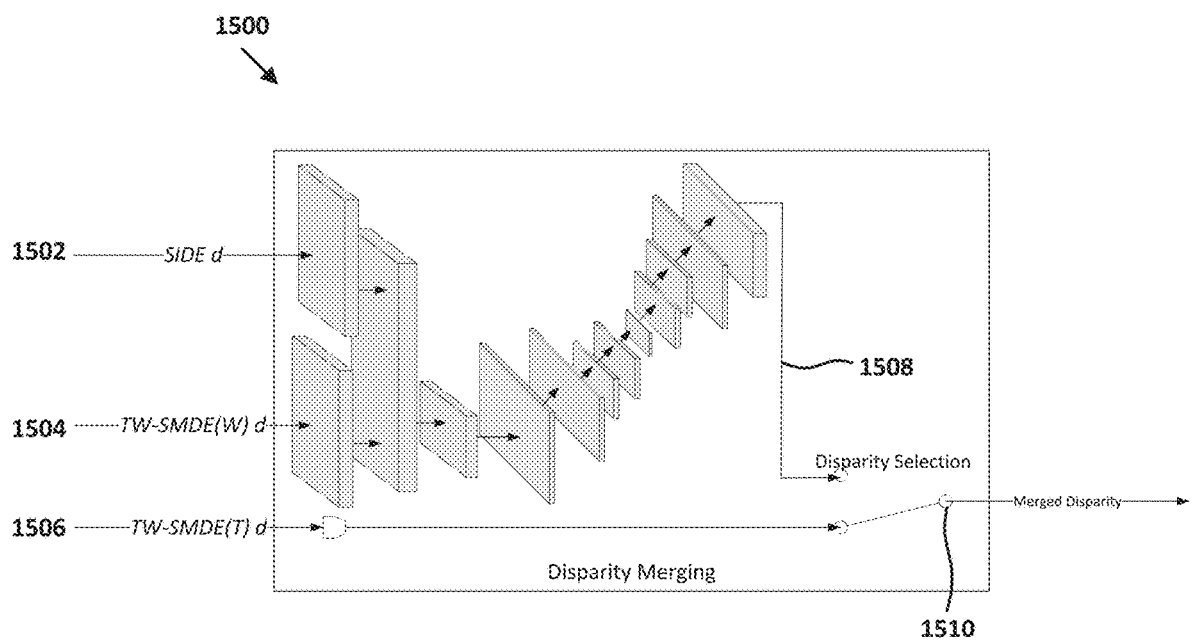
FIG. 15 is a diagram of disparity merging and selection, according to an embodiment.

FIG. 15 is a diagram of disparity merging and selection, according to an embodiment. In FIG. 15, a more accurate estimation of the disparity can be made just for the overlapping region using stereo matching (SM) (e.g. by using TW-SMNet(T)). However, SM on the zero padded wide FOVs can produce disparity estimates for both the overlapping and surrounding regions using TW-SMNet(W) for the full wide FOV, which can be merged using the fusion network to produce more accurate disparity estimates for surrounding regions. However, if complexities allow, one can utilize the best algorithm/process for the overlapped tele FOV by using a $3^{rd}$ input to the disparity block representing the disparity estimates from accurate SM on the overlapped tele region. For example, the SIDE disparity 1502 and the TW-SMNet(W) disparity 1504 are merged into the merged disparity 1508, and the selection 1510 is performed between the TW-SMNet(T) disparity 1506 and the merged disparity 1508.

The wide FOV and tele FOV RGB image features can also be input to the disparity merging block. Other features extracted from the RGB images, such as edge maps, or semantic segmentation maps can further be concatenated as input features together with the different disparity maps.

At 512, the disparity maps are post-processed to enhance quality (e.g., via the post processing blocks of FIGS. 10-13). The post processing block aims to provide perceptually pleasing disparity maps. Even after merging using non-linear operations as in neural networks, one can observe a discontinuity around the boundary between the overlapped and the non-overlapped FOV. Post processing aims to smooth out such effects, so the boundary effects are not obvious. It is also used to adjust the output disparity for the desired application.

One example of post processing to reduce the effect of abrupt change in disparity around the overlapped region boundary is smoothing the disparity. However, the edges often represent one object, and the goal is to fill the object with a smoothed depth estimate. One solution is to use edge preserving smoothing. Edge preserving smoothing can be implemented by computing the filtered output as a weighted average which can be implemented iteratively. Local filters such as the bilateral filter may be utilized. One limitation of the bilateral filter and other local filters is that they may not be able to resolve the ambiguity whether to preserve or smooth specific edges in the disparity maps. Using the RGB images as a guidance to smoothing, so as to preserve the edges in the RGB image, which is called edge guided filtering may be utilized. Optimizing a global objective functions defined with a data constraints and a smoothness prior, called fast global smoother (FGS) may also be utilized. Hence, FGS filtered values around the boundary depends on the whole disparity map. In one example, the filtered values around the boundary are calculated using the global filters by deploying FGS. Then only the strip around the boundary in the merged disparity is replaced with the filtered one, and the rest deploys the original merged values.

Figure 16:
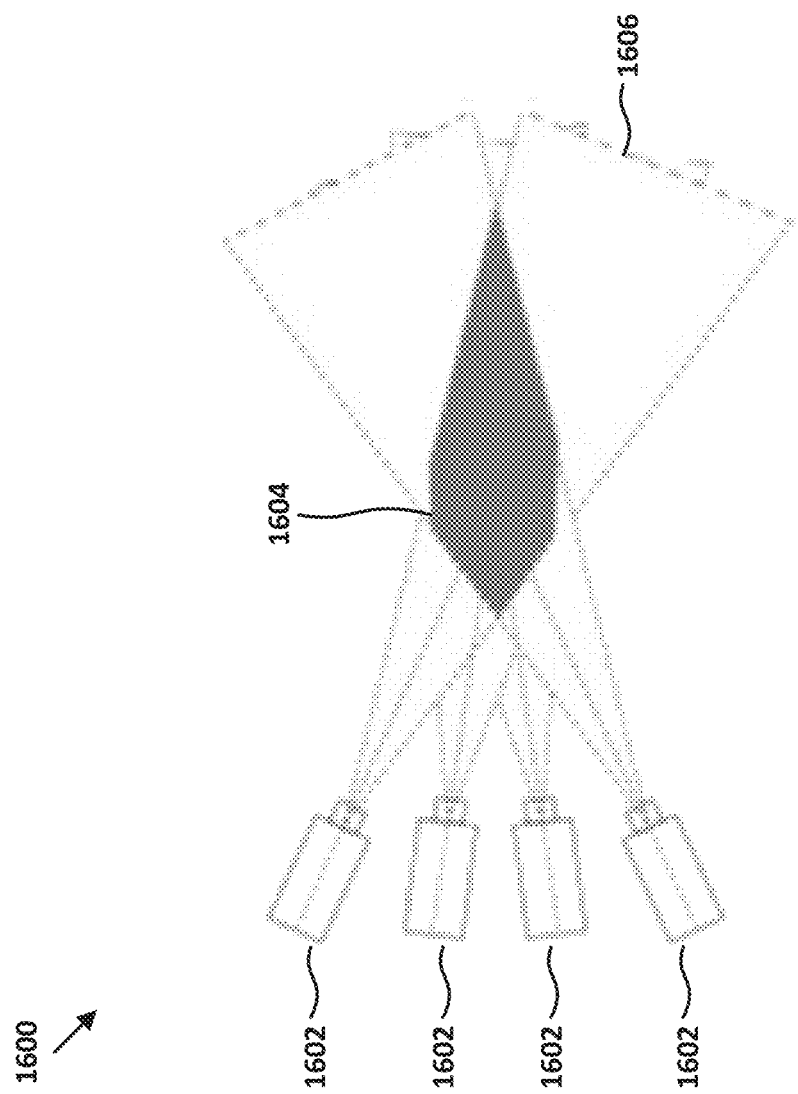
FIG. 16 is a diagram of union FOV and overlapping FOV when there are four cameras, according to an embodiment.

As described above, the present system and method utilize only two cameras. However, this can be readily extended to more than two cameras. FIG. 16 is a diagram of union FOV and overlapping FOV when there are four cameras, according to an embodiment. FIG. 16 shows a verged camera configuration 1602, where the dark region 1604 shows the overlapped FOV which is the common 3D space viewable from all cameras, and the dashed 1606 region shows the union FOV.

A straightforward approach is that each reference image is rectified and stereo matched with (N_cameras—1) rectified images, respectively. A very accurate depth estimate can be obtained for the FOV 1604 which is overlapped across cameras, by using a deep learning approach. Because the locations of the cameras with respect to each other are fixed, a disparity between any pair of rectified images should translate to certain values between the remaining pairs, which can be used to get a more accurate result for the overlapping FOV 1604. Parts of the union FOV 1606, will be overlapping between two cameras, but not all the cameras. SM between these camera pairs can be used to get a good estimate of the disparity in this region. Regions in the union FOV 1606, which are only seen by one camera will utilize single image disparity estimation. Alternatively, the union FOV 1606 can utilize all input images, as well disparity estimates for parts in the union FOV 1606 which are overlapping between at least cameras. Other approaches for the fusion between disparity maps and post processing smoothing which were described above are also applicable in this example.

An alternative example with respect to FIG. 16 is a system in which three cameras are utilized. The first camera may have a tele FOV, the second camera may have a wide FOV, and the third camera may have an ultra-wide FOV. As described above with respect to FIG. 5, the union FOV disparity estimate and the overlapping FOV disparity estimate may be merged for an image from the tele FOV and an image from the wide FOV. This method may be repeated recursively to generate a depth estimate for the ultra-wide FOV by SM between the ultra-wide FOV and the wide FOV, using the previously estimated depth for the wide FOV. In such examples, the ultra-wide FOV may be utilized as the union FOV, and the wide FOV may be utilized as the overlapping FOV.

Figure 17:
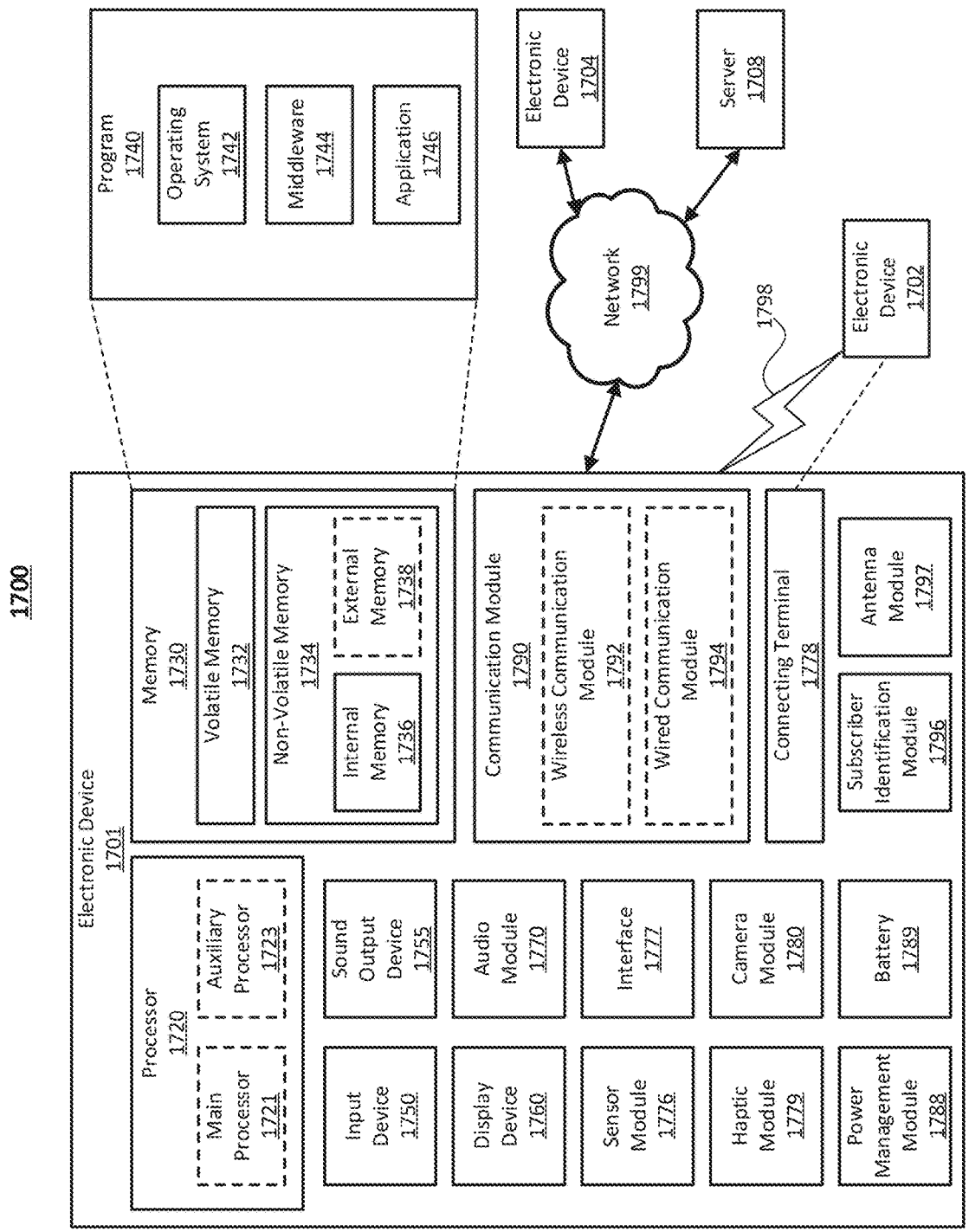
FIG. 17 is a block diagram of an electronic device in a network environment, according to one embodiment.

FIG. 17 is a block diagram of an electronic device 1701 in a network environment 1700, according to one embodiment. Referring to FIG. 17, the electronic device 1701 in the network environment 1700 may communicate with an electronic device 1702 via a first network 1798 (e.g., a short-range wireless communication network), or an electronic device 1704 or a server 1708 via a second network 1799 (e.g., a long-range wireless communication network). The electronic device 1701 may communicate with the electronic device 1704 via the server 1708. The electronic device 1701 may include a processor 1720, a memory 1730, an input device 1750, a sound output device 1755, a display device 1760, an audio module 1770, a sensor module 1776, an interface 1777, a haptic module 1779, a camera module 1780, a power management module 1788, a battery 1789, a communication module 1790, a subscriber identification module (SIM) 1796, or an antenna module 1797. In one embodiment, at least one (e.g., the display device 1760 or the camera module 1780) of the components may be omitted from the electronic device 1701, or one or more other components may be added to the electronic device 1701. In one embodiment, some of the components may be implemented as a single integrated circuit (IC). For example, the sensor module 1776 (e.g., a fingerprint sensor, an iris sensor, or an illuminance sensor) may be embedded in the display device 1760 (e.g., a display).

The processor 1720 may execute, for example, software (e.g., a program 1740) to control at least one other component (e.g., a hardware or a software component) of the electronic device 1701 coupled with the processor 1720, and may perform various data processing or computations. As at least part of the data processing or computations, the processor 1720 may load a command or data received from another component (e.g., the sensor module 1776 or the communication module 1790) in volatile memory 1732, process the command or the data stored in the volatile memory 1732, and store resulting data in non-volatile memory 1734. The processor 1720 may include a main processor 1721 (e.g., a central processing unit (CPU) or an application processor (AP)), and an auxiliary processor 1723 (e.g., a graphics processing unit (GPU), an image signal processor (ISP), a sensor hub processor, or a communication processor (CP)) that is operable independently from, or in conjunction with, the main processor 1721. Additionally or alternatively, the auxiliary processor 1723 may be adapted to consume less power than the main processor 1721, or execute a particular function. The auxiliary processor 1723 may be implemented as being separate from, or a part of, the main processor 1721.

The auxiliary processor 1723 may control at least some of the functions or states related to at least one component (e.g., the display device 1760, the sensor module 1776, or the communication module 1790) among the components of the electronic device 1701, instead of the main processor 1721 while the main processor 1721 is in an inactive (e.g., sleep) state, or together with the main processor 1721 while the main processor 1721 is in an active state (e.g., executing an application). According to one embodiment, the auxiliary processor 1723 (e.g., an image signal processor or a communication processor) may be implemented as part of another component (e.g., the camera module 1780 or the communication module 1790) functionally related to the auxiliary processor 1723.

The memory 1730 may store various data used by at least one component (e.g., the processor 1720 or the sensor module 1776) of the electronic device 1701. The various data may include, for example, software (e.g., the program 1740) and input data or output data for a command related thereto. The memory 1730 may include the volatile memory 1732 or the non-volatile memory 1734.

The program 1740 may be stored in the memory 1730 as software, and may include, for example, an operating system (OS) 1742, middleware 1744, or an application 1746.

The input device 1750 may receive a command or data to be used by other component (e.g., the processor 1720) of the electronic device 1701, from the outside (e.g., a user) of the electronic device 1701. The input device 1750 may include, for example, a microphone, a mouse, or a keyboard.

The sound output device 1755 may output sound signals to the outside of the electronic device 1701. The sound output device 1755 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 1760 may visually provide information to the outside (e.g., a user) of the electronic device 1701. The display device 1760 may include, for example, a display, a hologram device, or a projector and control circuitry to control a corresponding one of the display, hologram device, and projector. According to one embodiment, the display device 1760 may include touch circuitry adapted to detect a touch, or sensor circuitry (e.g., a pressure sensor) adapted to measure the intensity of force incurred by the touch.

The audio module 1770 may convert a sound into an electrical signal and vice versa. According to one embodiment, the audio module 1770 may obtain the sound via the input device 1750, or output the sound via the sound output device 1755 or a headphone of an external electronic device 1702 directly (e.g., wired) or wirelessly coupled with the electronic device 1701.

The sensor module 1776 may detect an operational state (e.g., power or temperature) of the electronic device 1701 or an environmental state (e.g., a state of a user) external to the electronic device 1701, and then generate an electrical signal or data value corresponding to the detected state. The sensor module 1776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1777 may support one or more specified protocols to be used for the electronic device 1701 to be coupled with the external electronic device 1702 directly (e.g., wired) or wirelessly. According to one embodiment, the interface 1777 may include, for example, a high definition multimedia interface (HDMI), a universal serial bus (USB) interface, a secure digital (SD) card interface, or an audio interface.

A connecting terminal 1778 may include a connector via which the electronic device 1701 may be physically connected with the external electronic device 1702. According to one embodiment, the connecting terminal 1778 may include, for example, an HDMI connector, a USB connector, an SD card connector, or an audio connector (e.g., a headphone connector).

The haptic module 1779 may convert an electrical signal into a mechanical stimulus (e.g., a vibration or a movement) or an electrical stimulus which may be recognized by a user via tactile sensation or kinesthetic sensation. According to one embodiment, the haptic module 1779 may include, for example, a motor, a piezoelectric element, or an electrical stimulator.

The camera module 1780 may capture a still image or moving images. According to one embodiment, the camera module 1780 may include one or more lenses, image sensors, image signal processors, or flashes.

The power management module 1788 may manage power supplied to the electronic device 1701. The power management module 1788 may be implemented as at least part of, for example, a power management integrated circuit (PMIC).

The battery 1789 may supply power to at least one component of the electronic device 1701. According to one embodiment, the battery 1789 may include, for example, a primary cell which is not rechargeable, a secondary cell which is rechargeable, or a fuel cell.

The communication module 1790 may support establishing a direct (e.g., wired) communication channel or a wireless communication channel between the electronic device 1701 and the external electronic device (e.g., the electronic device 1702, the electronic device 1704, or the server 1708) and performing communication via the established communication channel. The communication module 1790 may include one or more communication processors that are operable independently from the processor 1720 (e.g., the AP) and supports a direct (e.g., wired) communication or a wireless communication. According to one embodiment, the communication module 1790 may include a wireless communication module 1792 (e.g., a cellular communication module, a short-range wireless communication module, or a global navigation satellite system (GNSS) communication module) or a wired communication module 1794 (e.g., a local area network (LAN) communication module or a power line communication (PLC) module). A corresponding one of these communication modules may communicate with the external electronic device via the first network 1798 (e.g., a short-range communication network, such as Bluetooth™, wireless-fidelity (Wi-Fi) direct, or a standard of the Infrared Data Association (IrDA)) or the second network 1799 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1792 may identify and authenticate the electronic device 1701 in a communication network, such as the first network 1798 or the second network 1799, using subscriber information (e.g., international mobile subscriber identity (IMSI)) stored in the subscriber identification module 1796.

The antenna module 1797 may transmit or receive a signal or power to or from the outside (e.g., the external electronic device) of the electronic device 1701. According to one embodiment, the antenna module 1797 may include one or more antennas, and, therefrom, at least one antenna appropriate for a communication scheme used in the communication network, such as the first network 1798 or the second network 1799, may be selected, for example, by the communication module 1790 (e.g., the wireless communication module 1792). The signal or the power may then be transmitted or received between the communication module 1790 and the external electronic device via the selected at least one antenna.

At least some of the above-described components may be mutually coupled and communicate signals (e.g., commands or data) there between via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 1701 and the external electronic device 1704 via the server 1708 coupled with the second network 1799. Each of the electronic devices 1702 and 1704 may be a device of a same type as, or a different type, from the electronic device 1701. All or some of operations to be executed at the electronic device 1701 may be executed at one or more of the external electronic devices 1702, 1704, or 1708. For example, if the electronic device 1701 should perform a function or a service automatically, or in response to a request from a user or another device, the electronic device 1701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1701. The electronic device 1701 may provide the outcome, with or without further processing of the outcome, as at least part of a reply to the request. To that end, a cloud computing, distributed computing, or client-server computing technology may be used, for example.

One embodiment may be implemented as software (e.g., the program 1740) including one or more instructions that are stored in a storage medium (e.g., internal memory 1736 or external memory 1738) that is readable by a machine (e.g., the electronic device 1701). For example, a processor of the electronic device 1701 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. An electronic device, comprising:
 a first camera with a first field of view (FOV);
 a second camera with a second FOV that is narrower than the first FOV; and
 a processor configured to:
  capture a first image with the first camera, the first image having a union FOV;
  capture a second image with the second camera, the second image having the second FOV that is narrower than the first FOV,
  determine an overlapping portion of the second image in the first image, the overlapping portion having an FOV being narrower than the union FOV;
  generate an overlapping portion disparity estimate;
  generate a union FOV disparity estimate based on the second image that is scale adjusted to a resolution of the overlapping portion in the first image; and
  merge the union FOV disparity estimate with the overlapping portion disparity estimate.

2. The electronic device of claim 1, wherein the overlapping disparity estimation is generated using stereo matching network disparity estimation using the overlapping portion.

3. The electronic device of claim 1, wherein the processor is further configured to crop the determined overlapping portion from the first image and scale the overlapping portion from the second image to a resolution corresponding to the first image.

4. The electronic device of claim 3, wherein the processor is further configured to enhance the union FOV disparity estimate using the overlapping portion disparity estimate.

5. The electronic device of claim 1, wherein the union FOV disparity estimate is generated based on a depth estimation of the first FOV from the first image only and from information based on a camera baseline and a focal length of the first camera.

6. The electronic device of claim 1, wherein the processor is configured to merge the union FOV disparity estimate with the overlapping portion disparity estimate based on a bias and scale calibration in the overlapping portions in the two disparity estimates.

7. The electronic device of claim 1, wherein the union FOV disparity estimate is generated based on a disparity estimate from a red-green-blue (RGB) single image depth estimation (SIDE) network.

8. The electronic device of claim 1, wherein the union FOV disparity estimate is further generated between a zero-padded overlapping portion and the union FOV from a stereo matching disparity estimation (SMDE) network.

9. The electronic device of claim 1, wherein the union FOV disparity estimate is further generated between a zero-padded overlapping portion and the union FOV from a multi-task stereo matching disparity and single-image depth estimation (MT-SMDE) network.

10. The electronic device of claim 1, further comprising:
 a third camera with a third FOV that is wider than the first FOV,
 wherein the processor is further configured to:
  capture a third image with the third camera, the third image having a third FOV; and
  generate a depth estimation of the third image based on a depth estimation of the union FOV of the first image.

11. A method, comprising:
 capturing a first image with a first camera having a first field of view (FOV), the first image having a union FOV;
 capturing a second image with a second camera having a second FOV that is narrower than the first FOV
  determining an overlapping portion of the second image in the first image, the overlapping portion having an FOV being narrower than the union FOV;
  generating an overlapping portion disparity estimate;
  generating a union FOV disparity estimate based on the second image that is scale adjusted to a resolution of the overlapping portion in the first image; and
 merging the union FOV disparity estimate with the overlapping portion disparity estimate.

12. The method of claim 11, wherein the overlapping portion disparity estimation is generated using stereo matching network disparity estimation using the overlapping portion.

13. The method of claim 11, further comprising cropping the determined overlapping FOV from the first image and scaling the overlapping portion from the second image to a resolution corresponding to the first image.

14. The method of claim 13, further comprising enhancing the union FOV disparity estimate using the overlapping portion disparity estimate.

15. The method of claim 11, wherein the union FOV disparity estimate is generated based on a depth estimation of the first FOV of the first image only and from information based on a camera baseline and a focal length of the first camera.

16. The method of claim 11, wherein merging the union FOV disparity estimate with the overlapping portion disparity estimate is performed based on a bias and scale calibration in the overlapping portions in the two disparity estimates.

17. The method of claim 11, wherein the union FOV disparity estimate is generated based on a disparity estimate from a red-green-blue (RGB) single image depth estimation (SIDE) network.

18. The method of claim 11, wherein the union FOV disparity estimate is further generated between a zero-padded overlapping portion and the union FOV from a stereo matching disparity estimation (SMDE) network.

19. The method of claim 11, wherein the union FOV disparity estimate is further generated between a zero-padded overlapping portion and the union FOV from a multi-task stereo matching disparity and single-image depth estimation (MT-SMDE).

20. The method of claim 11, further comprising:
 capturing a third image with a third camera having a third FOV that is wider than the first FOV, and
 generating a depth estimation of the third image based on a depth estimation of the union FOV of the first image.

* * * * *